E. MATTMAN.
MOTOR WINDING.
APPLICATION FILED FEB. 17, 1913.
1,208,183.
Patented Dec. 12, 1916.
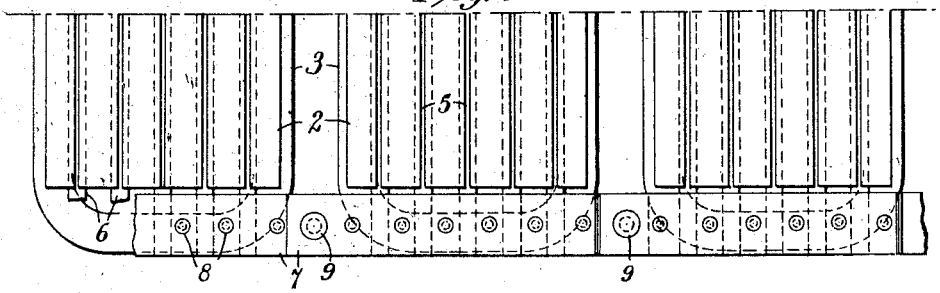
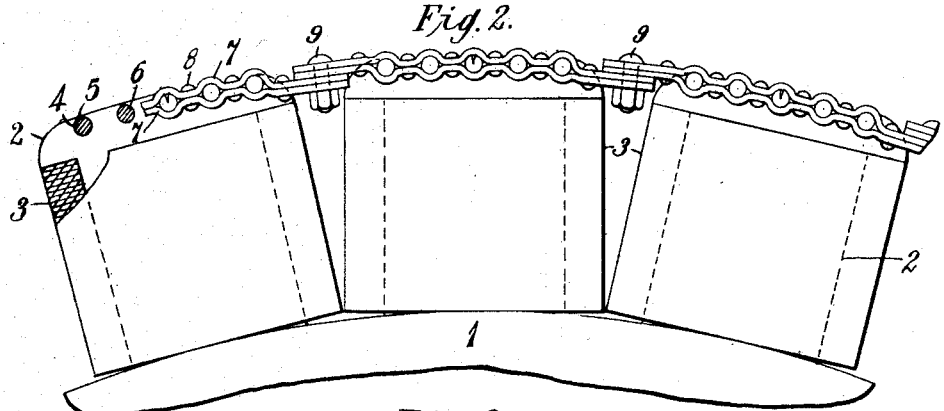
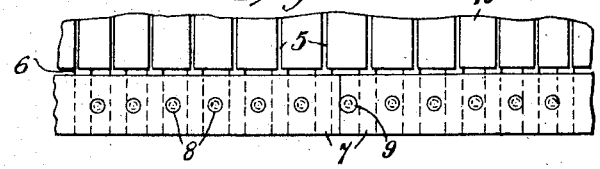
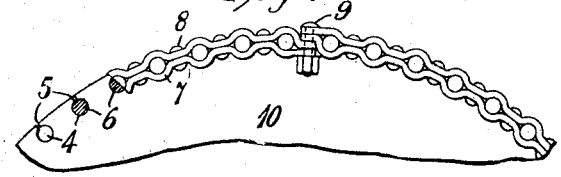
WITNESSES:
INVENTOR
Emil Mattman
BY
Wesley G. Carr
ATTORNEY

UNITED STATES PATENT OFFICE.

EMIL MATTMAN, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-WINDING.

1,208,183.

Specification of Letters Patent. Patented Dec. 12, 1916.

Application filed February 17, 1913. Serial No. 748,836.

*To all whom it may concern:*

Be it known that I, EMIL MATTMAN, a citizen of Switzerland, and a resident of Wilkinsburg, in the county of Allegheny and State of Pennsylvania, have invented a new and useful Improvement in Motor-Windings, of which the following is a specification.

My invention relates to windings for electrical machines and it has for its object to provide a structure that shall be adapted for use as an alternating current generator or as a synchronous motor.

A further object of my invention is to provide a winding for an induction motor of the squirrel cage type which will be of simple and substantial construction.

In starting a synchronous motor as an induction motor, the torque depends upon the resistance of a secondary or squirrel cage winding. The proper distribution of this winding and the relative amount of active material of the rotor are also important factors.

The characteristic curve of a synchronous motor shows that an increase of secondary resistance increases the starting torque, but an increase of secondary resistance also increases the secondary losses and lessens the ability of the motor to "pull in" or synchronize with the line, because of the increased slip. In the design of a motor, therefore, it is necessary to make the secondary resistance such that the losses will be as small as is consistent with the necessary starting torque.

In a generator, a short circuited winding of the squirrel cage type may be used with good results, as a damper winding to prevent surging and to aid in the operation of a plurality of such generators in parallel. A construction which is adapted for efficient operation either as a generator or as a motor reduces the number of dies and the kinds of parts required when a separate design is necessary for each machine. In providing a construction which accomplishes these results, a number of difficulties must be overcome. In a multipolar generator, it is necessary to limit the ratio of the pole arc to the pole pitch in order to keep the field leakage within practical limits. To eliminate the noise in a generator of this type having a comparatively small air gap and open armature slots, it is necessary that the pole tips be considerably beveled. This construction, of course, diminishes the arc covered by each pole and, as a result, the active material of the rotor is decreased and the ability of the motor to start under load is thereby lessened.

In using rectangular bars for the secondary winding, the beveling of the pole tips makes necessary the shifting of the outer bars toward the center. In some cases, this results in a loss of bars entirely. In the first case, a bad distribution and a loss of active material in the rotor is the result. In case of the loss of bars, it is necessary to design separate pole pieces for generators and motors, thereby increasing the cost of construction.

In using rectangular bars with beveled pole pieces, the pole teeth are liable to be broken. A relatively high pole tip is required, thus increasing the field leakage when the machine is operating as a generator under a low power factor. The use of a small number of bars renders it difficult to suitably limit the resistance of the secondary winding. In order to avoid these difficulties, I propose to use cylindrical bars in cylindrical holes in the pole pieces. These bars are held in place and connected as hereinafter described.

In the drawings, Figure 1 is a plan view of a portion of the rotating field magnet of a dynamo-electric machine equipped with my winding. Fig. 2 is an end view of the same. Fig. 3 is a plan view of a portion of the rotor of an induction motor and Fig. 4 is an end view of the same.

In Figs. 1 and 2, the rotating field structure 1 supports the pole pieces 2 composed of punched plates in the usual manner. The main coils are shown at 3. Inserted in slots 4 punched in the pole pieces 2 and having narrow openings 5 are cylindrical copper bars 6 that extend outwardly from each side of the pole pieces, only one side being shown.

Copper straps 7 are placed above and below the ends of the bars and are clamped together, between the bars, by rivets 8. The pairs of straps are clamped together by bolts 9, or they may be fastened together in any other suitable manner. The straps 7 may be formed by punching and should have sufficient resilience to insure good contact with the bars and with each other.

In Figs. 3 and 4, the same construction is shown as applied to the rotor of an induction motor. In these views, 10 is the iron core of the rotor and the remaining numerals designate parts which correspond to those of Figs. 1 and 2. Each strap 7 may be in one piece or in sections, as desired.

The advantages of this construction, when applied to a synchronous motor adapted for use as a generator, are that the number of bars may be increased because the cylindrical bars may be placed near the beveled edge without seriously reducing the section of material, and the distribution of the bars may be improved. Other advantages are that the resistance of the secondary winding is more easily regulated, the height of the pole tips may be such that the machine is adapted for use both as a generator and as a motor, and the breaking of the pole teeth because of angular slot corners is obviated.

The result is to produce a machine which is capable of being satisfactorily used, both as an alterator and as a synchronous motor. The starting torque may be made sufficiently high and, owing to the number of bars and the distribution of the same; the active material of the rotor is increased; the slip is decreased and, thereby, the ability of the machine to quickly reach synchronism under load is increased.

I claim as my invention:

1. In a dynamo-electric machine, the combination with pole pieces and energizing coils therefor, of an auxiliary winding on said pole pieces comprising conductor bars, conductors for connecting said bars, and means for clamping said conductors in direct engagement with said bars and with each other.

2. In a dynamo-electric machine, a rotor having slots, conductor bars in said slots, straps for connecting said bars, and means for clamping the straps in direct engagement with the bars and with each other.

3. In a dynamo-electric machine, the combination with pole pieces and magnetizing coils therefor, an auxiliary winding upon each of said pole pieces, comprising conductor bars substantially cylindrical in cross section, said bars being mounted in holes in the said pole pieces, means for connecting said bars comprising corrugated straps, and means for clamping said straps together.

4. In a dynamo-electric machine, a rotor having slots, a squirrel cage winding therefor, comprising conductor bars mounted in said slots, a corrugated strap on each side of said bars and means for fastening said straps together between said bars.

5. In a dynamo-electric machine having relatively movable members, the combination with a plurality of conductor bars carried by one of said members, of means for connecting said bars comprising conductors on opposite sides thereof, and having portions in contact with each other between adjacent bars.

6. In a dynamo-electric machine having relatively movable members, the combination with a plurality of conductor bars carried by one of said members, of means for connecting said bars comprising an inner and an outer ring having portions in contact with each other between adjacent bars.

In testimony whereof I have hereunto subscribed my name this 5th day of February, 1913.

EMIL MATTMAN.

Witnesses:
 ALFRED SCHUENBERGER,
 B. B. HINES.